Nov. 8, 1966 R. S. MERRIAM 3,283,358
HEAVY DUTY CASTER

Filed Sept. 16, 1964 2 Sheets-Sheet 1

INVENTOR
Richard S. Merriam

BY Walter G. Finch
ATTORNEY

Nov. 8, 1966 R. S. MERRIAM 3,283,358
HEAVY DUTY CASTER
Filed Sept. 16, 1964 2 Sheets-Sheet 2

INVENTOR
Richard S. Merriam

BY *Walter G. Finch*
ATTORNEY

3,283,358
HEAVY DUTY CASTER
Richard S. Merriam, 606 Olesmont Road, Baltimore, Md.
Filed Sept. 16, 1964, Ser. No. 396,954
1 Claim. (Cl. 16—20)

This invention relates generally to swiveled wheels, and more particularly it pertains to a heavy duty caster for use in a wet environment.

In the meat packing industry and especially plants handling sea food, the cost of maintaining the many carts, tables and scaffolds of portable type is high. The main cause is caster breakdown occasioned by the severe duty conditions.

These casters are called upon to operate almost continuously in water and often brine and unless they roll and pivot very easily they are quickly damaged. Ordinary grease lubrication is not the answer, this being quickly emulsified and washed out. The attempts to provide a sealed bearing using O-rings and the like have generally resulted in an overly tight bearing. Also, no matter how tight the seal in the wheel or swivel may be, if it is loose enough to permit the wheel or swivel to rotate, moisture can get past the seal. Once the moisture is past the seal, it is trapped there, where it can very satisfactorily emulsify the so-called permanent factory lubrication. In the case of an unsealed wheel or swivel bearing, daily greasing is often required. If the bearings are not greased they will corrode, gall and seize, and ultimately no rotation can take place.

It is an object of this invention to provide a bearing, which is both free turning and self lubricating, requires no maintenance and is self-protecting against rust and corrosion under the most severe conditions of moisture.

Another object of this invention is to provide a caster incorporating the novel bearing whereby the swivel plate and fork have enhanced environment resistive properties.

Still other objects of this invention are to provide a heavy duty caster which is economical to manufacture, which is efficient and reliable in operational use, and which is easy to install and maintain.

Other objects and attendant advantages of this invention will become more readily apparent and understood from the following detailed specification and accompanying drawings in which.

Figure 1:
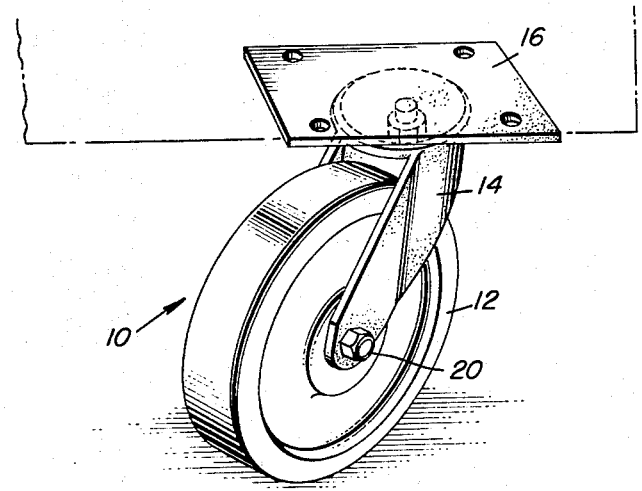
FIG. 1 is a perspective view of a caster incorporating features of this invention.

Referring now to the details of the drawings, as shown in FIG. 1 the novel caster 10 has the general appearance of the usual article having a wheel 12 mounted on a swivel fork 14 which pivots on a swivel plate 16.

Figure 2:
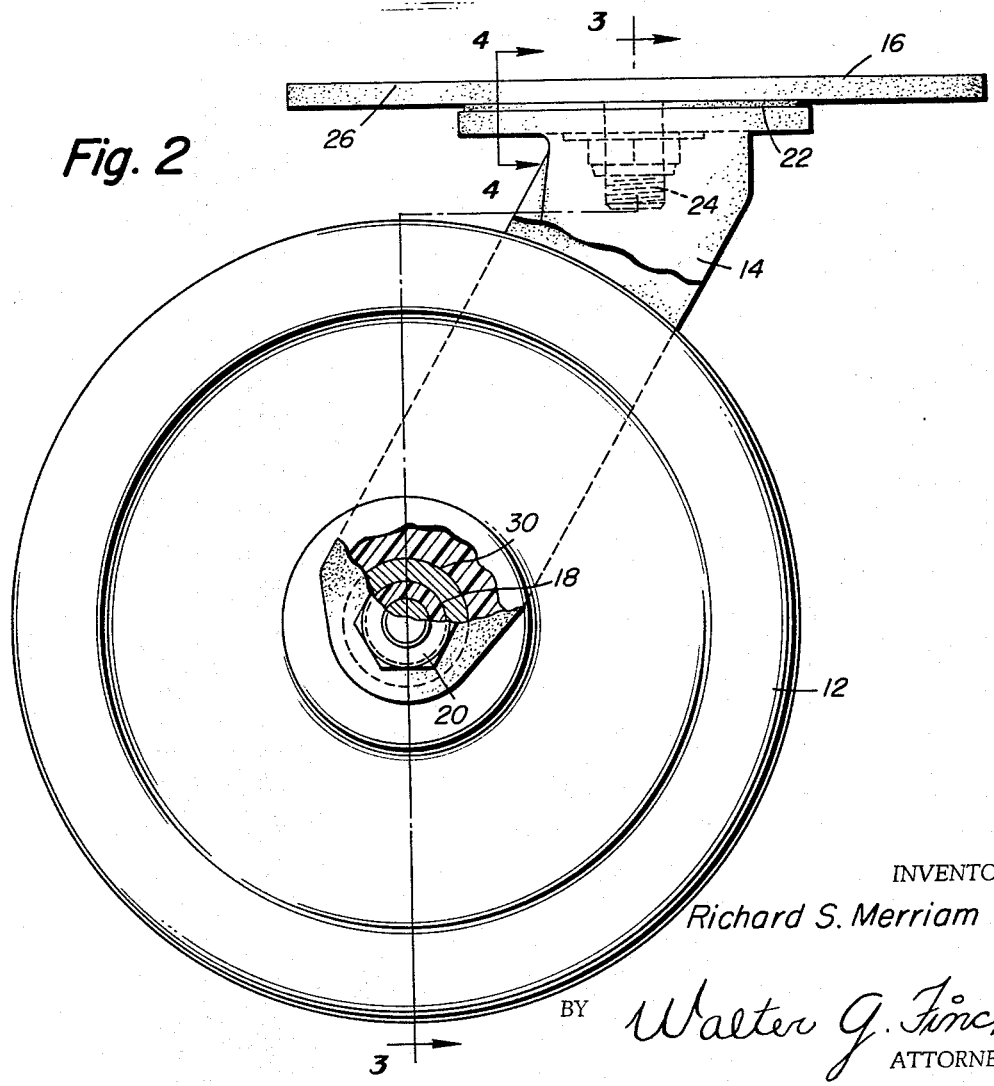
FIG. 2 is a side elevation of the caster of FIG. 1.
Figure 3:
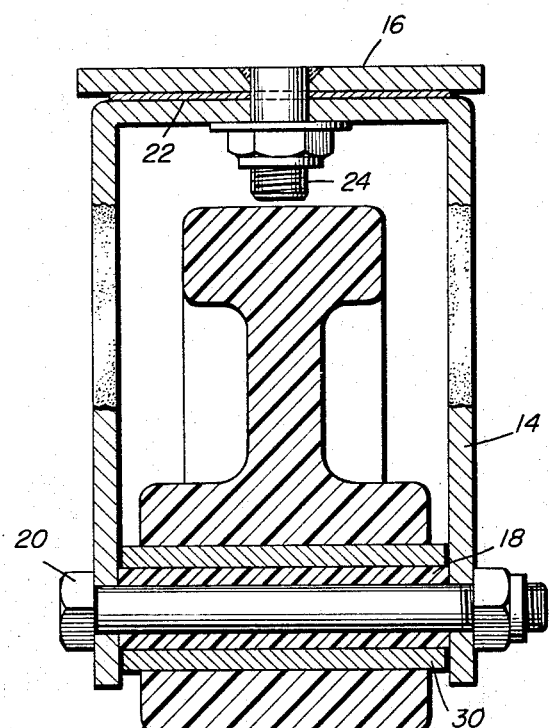
FIG. 3 is a vertical section taken on line 3—3 of FIG. 2.

As best shown in FIGS. 2 and 3, the wheel 12 is journalled on a nylon or Teflon-coated steel or stainless steel sleeve bushing, which is tightly clamped between the prongs of the fork 14 by means of a thru-bolt and nut 20. The top of the fork 14 is spaced from the swivel plate 16 by a nylon-coated or Teflon-coated bearing disc 22 and secured by a pivot bolt and nut 24.

Figure 4:
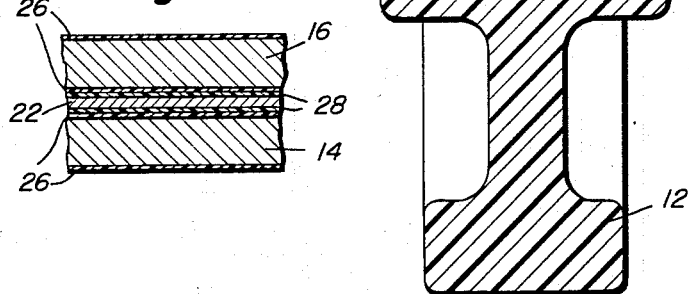
FIG. 4 is a much enlarged cross sectional detail taken on line 4—4 of FIG. 2.
Figure 5:
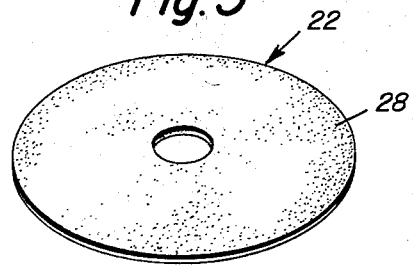
FIG. 5 is a perspective view of a swivel bearing disc.
Figure 6:
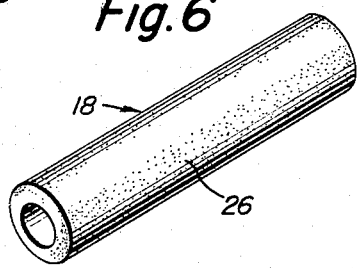
FIG. 6 is a perspective view of a wheel axle.

The entire surfaces of the swivel fork 14, the swivel plate 16 and cylindrical axle 18 are provided with a dipped nylon coating 26 as best shown in FIGS. 4 and 6. The bearing disc 22 is coated overall with a baked-on layer of Teflon 28, with further reference to FIG. 5. The wheel 12 is provided with a stainless steel sleeve whose inner surface is polished to 90-micro-inches or more of smoothness, this sleeve is press-fitted into the wheel hub.

It should be noted that the contacting bearing surfaces in all cases are thus thin films of nylon against Teflon combining the best qualities of both for a free-turning tough service bearing requiring no lubrication. Further, the coatings 26 and 28 give an excellent sanitary and protective finish to the underlying metal for long-lasting service under the severe environment conditions particular to meat packing industry where high moisture conditions prevail and steam cleaning is commonly used.

In the light of the foregoing, it is obvious that there may be an interchange of the nylon coated parts with the Teflon coated parts without departing from the spirit of the invention. Further certain benefits may accrue from such interchange, for example, the use of an all-nylon wheel may be desirable and the pressed-in bearing sleeve dispensed with.

Also, if desired, the fork top plate can be made of stainless steel with a stainless king bolt, with a nylon-coated or Teflon-coated disc being placed between the top plate and the fork assembly. Also, the nylon-coated steel fork assembly can be changed to a stainless steeel fork assembly as the application of the invention may require.

Obviously many modifications and variations of the present invention are possible in light of the above teachings. It is, therefore, to be understood that within the scope of the appended claim the invention may be practiced otherwise than as specifically described.

What is claimed is:

A caster comprising a swivel plate coated with nylon, a nylon coated swivel fork member mounted to said swivel plate and having a wheel journalled therefrom, and a bearing member consisting of a disc having a tetrafluoroethylene polymer coating thereon positioned between said swivel plate and said swivel fork member.

References Cited by the Examiner
UNITED STATES PATENTS
| | | | |
|---|---|---|---|
| 2,666,677 | 1/1954 | Miller | 16—2 |
| 2,675,283 | 4/1954 | Thomson. | |
| 2,809,130 | 10/1957 | Rappaport. | |
| 2,812,532 | 11/1957 | Geiger | 16—18 |

FOREIGN PATENTS
| | | |
|---|---|---|
| 247,211 | 9/1963 | Australia. |
| 1,116,740 | 2/1956 | France. |
| 857,866 | 1/1961 | Great Britain. |

OTHER REFERENCES
GRC, "Die Cast Industrial Fasteners," September 1961, page 7.

PATRICK A. CLIFFORD, *Primary Examiner.*
JOSEPH D. SEERS, *Examiner.*
D. L. TROUTMAN, *Assistant Examiner.*